(12) United States Patent
Ashdown (10) Patent No.: US 7,255,458 B2
(45) Date of Patent: Aug. 14, 2007

(54) SYSTEM AND METHOD FOR THE DIFFUSION OF ILLUMINATION PRODUCED BY DISCRETE LIGHT SOURCES

(75) Inventor: Ian Ashdown, West Vancouver (CA)

(73) Assignee: Tir Systems, Ltd., Burnaby (CA)

( * ) Notice: Subject to any disclaimer, the term of this patent is extended or adjusted under 35 U.S.C. 154(b) by 0 days.

(21) Appl. No.: 10/897,309

(22) Filed: Jul. 21, 2004

(65) Prior Publication Data

US 2005/0063063 A1    Mar. 24, 2005

Related U.S. Application Data

(60) Provisional application No. 60/489,172, filed on Jul. 22, 2003.

(51) Int. Cl.
*F21V 5/00* (2006.01)
(52) U.S. Cl. ............... 362/246; 362/231; 362/240; 362/268; 362/331; 362/612
(58) Field of Classification Search ............... 362/231, 362/240, 242, 243, 246, 268, 331, 612
See application file for complete search history.

(56) References Cited

U.S. PATENT DOCUMENTS

| | | | |
|---|---|---|---|
| 4,536,833 A | 8/1985 | Davis | 362/293 |
| 4,564,888 A | 1/1986 | Lewin et al. | 362/147 |
| 4,748,543 A | 5/1988 | Swarens | 362/147 |

(Continued)

FOREIGN PATENT DOCUMENTS

WO    WO 02/08799 A2    1/2002
WO    WO 03/052316 A1    6/2003

OTHER PUBLICATIONS

Wadle, S., et al., Holographic Diffusers, Optical Engineering, 33(1):213-218 (1994).

(Continued)

*Primary Examiner*—Stephen F. Husar
*Assistant Examiner*—Meghan K. Dunwiddie
(74) *Attorney, Agent, or Firm*—Pillsbury Winthrop Shaw Pittman LLP (57) ABSTRACT

The present invention provides a system and method for the diffusion of illumination from discrete light sources such that the illumination is blended and directed in one or more desired directions. The illumination system comprises a substrate having a plurality of light-emitting elements thereon which are arranged in an array, wherein these light-emitting elements produce illumination at one or more wavelengths. Proximate to the light-emitting elements is a diffuser, which collects the illumination produced by the discrete light-emitting elements and redirects this illumination in one or more predetermined directions, thereby blending together the one or more wavelengths of illumination and concentrating the illumination in the predetermined directions. The illumination system further comprises a power system, which provides energy to the light-emitting elements thereby resulting in their activation. Through the blending of the illumination produced by the discrete light-emitting elements together with the redirection of the illumination in a desired direction, both of which are enabled by the diffuser placed proximate to the discrete light-emitting elements, the creation of a blended pattern of illumination from these discrete light-emitting elements is provided, wherein this pattern of illumination can be one or more lines or planes of illumination.

21 Claims, 11 Drawing Sheets

U.S. PATENT DOCUMENTS

| | | | |
|---|---|---|---|
| 4,984,812 A | 1/1991 | Wada et al. | 277/153 |
| 5,032,958 A | 7/1991 | Harwood | 362/217 |
| 5,165,772 A | 11/1992 | Wu | 362/26 |
| 5,295,047 A | 3/1994 | Windross | 362/26 |
| 5,590,945 A | 1/1997 | Simms | 362/31 |
| 5,835,661 A | 11/1998 | Tai et al. | 385/146 |
| 5,954,423 A * | 9/1999 | Logan et al. | 362/235 |
| 6,038,005 A * | 3/2000 | Handschy et al. | 349/61 |
| 6,100,952 A | 8/2000 | Marvin et al. | 349/62 |
| 6,130,976 A * | 10/2000 | Hoffman et al. | 385/56 |
| 6,361,186 B1 * | 3/2002 | Slayden | 362/249 |
| 6,676,284 B1 * | 1/2004 | Wynne Willson | 362/555 |
| 2002/0030992 A1 | 3/2002 | Lefebvre et al. | 362/243 |
| 2002/0034012 A1 | 3/2002 | Santoro et al. | 359/599 |
| 2003/0081419 A1 | 5/2003 | Jacob et al. | 362/364 |

OTHER PUBLICATIONS

Wadle, S., et al., Holographic Diffusers: Diffusers with Low Backscatter, J. Modern Optics, 42:1387-1396 (1995).

* cited by examiner

SYSTEM AND METHOD FOR THE DIFFUSION OF ILLUMINATION PRODUCED BY DISCRETE LIGHT SOURCES

CLAIM OF PRIORITY

This application claims priority from now expired U.S. Provisional Patent Application No. 60/489,172 filed Jul. 22, 2003.

FIELD OF THE INVENTION

The present invention pertains to the field of lighting and in particular to the area of light diffusion with respect to illumination generated by discrete light sources.

BACKGROUND

When using discrete light sources, for example light emitting diodes, to create an illumination effect, there is the need for the blending of the illumination created by these discrete light sources into a uniform lighting condition. For example, by fabricating a linear array of discrete light sources having a spacing therebetween, the light emitted thereby would typically be capable of creating neither a uniformly luminous linear line of light nor an even wash of light for wall washing or cove lighting, for example. In particular, problems arise when the illumination is being created by discrete light sources having a variety of colours therefore the blending of the separate colours is important for a smooth lighting condition.

Linear arrays of light emitting diodes mounted on circuit boards and enclosed in plastic tubes, such as TIR Systems Ltd.'s LightMark™ products, are used mainly for corporate identity applications in substitute of neon lighting. The disadvantage of these products is that the light emitting diodes constitute point sources of light and in order to ensure an even luminance distribution along the length of the tube, this tube must incorporate some means of diffusing the light.

Injection-molded and extruded plastics are the preferred material for diffusion. However, as discussed in IESNA Lighting Handbook, 9$^{th}$ Edition, the transmittance of these plastics varies between 30 and 70 percent for "white" (as opposed to clear) plastic. Thus, typically between 30 and 70 percent of the light emitted by the light emitting diodes is absorbed by this plastic tubing.

Figure 1:
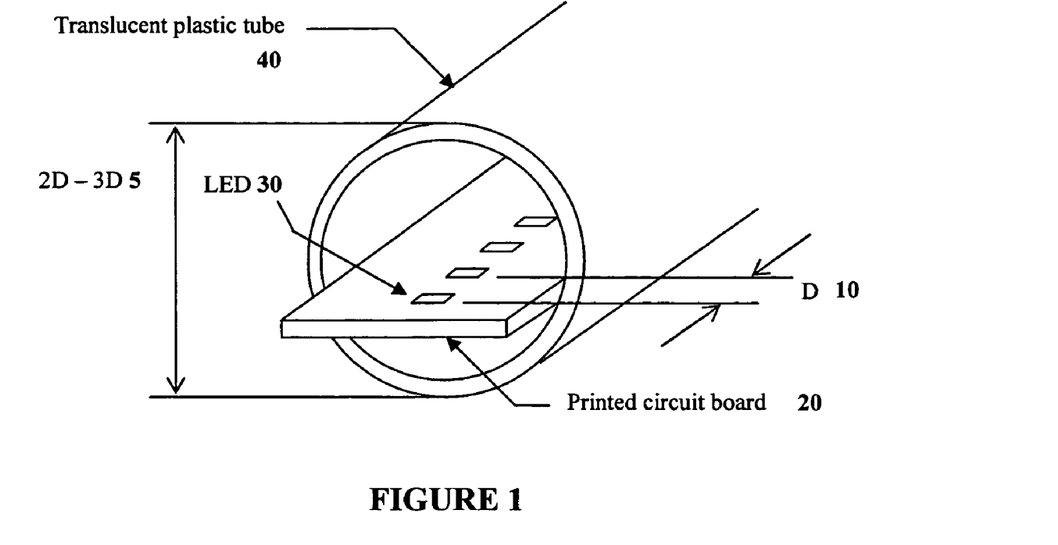
FIG. 1 is a perspective view of an elongated lighting apparatus according to the prior art.

A second disadvantage of this type of diffuser, is that the plastic tubing must have sufficient cross-sectional area such that the distance between the light emitting diodes and the inner wall of the tubing is sufficient to enable even distribution of light and hence an even luminance distribution along the length of the tube. Failure to observe this requirement can result in an uneven luminance distribution and the perception of illumination hot spots. A consequence of this requirement is that the minimum tube diameter 5 is typically about two to three times the light emitting diode spacing, D 10 as illustrated in FIG. 1. In addition to this requirement, the printed circuit board 20 is preferably painted white or the same color as the light emitting diode 30 emission in order to facilitate diffusion of light that is reflected from the interior wall of the plastic tube 40. This combination of limitations and requirements, in addition to economic constraints on the number of light emitting diodes per unit length, which directly affects the spacing, D 10, practically limits the diameter of the plastic tubing to a minimum of approximately 20 mm. A minimum diameter of 20 mm can be acceptable for outdoor applications, however this configuration can be visually intrusive for many indoor applications, in particular for retail displays and shop window delineation. Thus this method of creating an even linear illumination does not achieve a sufficiently thin line of light for a number of applications.

Light guides made from a high refractive index material have been successfully employed to create a line of light from a point source. For example, U.S. Pat. No. 5,590,945 discloses an optical element that uses a total-internal reflection light guide to create a line of light from one or two light emitting diode point sources by internally reflecting the light along an axis, wherein beams of light escape the light pipe along the axis of the pipe. This form of lighting apparatus is designed such that the light guide is to be hidden inside a wall or panel. In addition, the length of the light line created is limited by the constraints on the length of the mold used to create the light guides. In addition, U.S. Pat. Nos. 5,165,772, 5,295,047 and 5,835,661 are also examples of the use of total internal reflection to create a line of light from a point source. While these methods and apparatus achieve a sufficiently thin line of light, the length of the line is effectively limited and the light guides cannot be easily configured end-to-end to create a longer continuous line of light. Furthermore, this method uses a very limited number of light sources, which in turn restricts the luminance and perceived visual brightness of the resulting line. As each of the above uses light guides to direct a point source of light into a line of light, and hence all suffer from the limitation on luminance. As such a line of light with high luminance and sufficient length cannot be achieved by using the above. An additional draw back is the fact that only a single pattern is achievable with this type of display.

Figure 2:
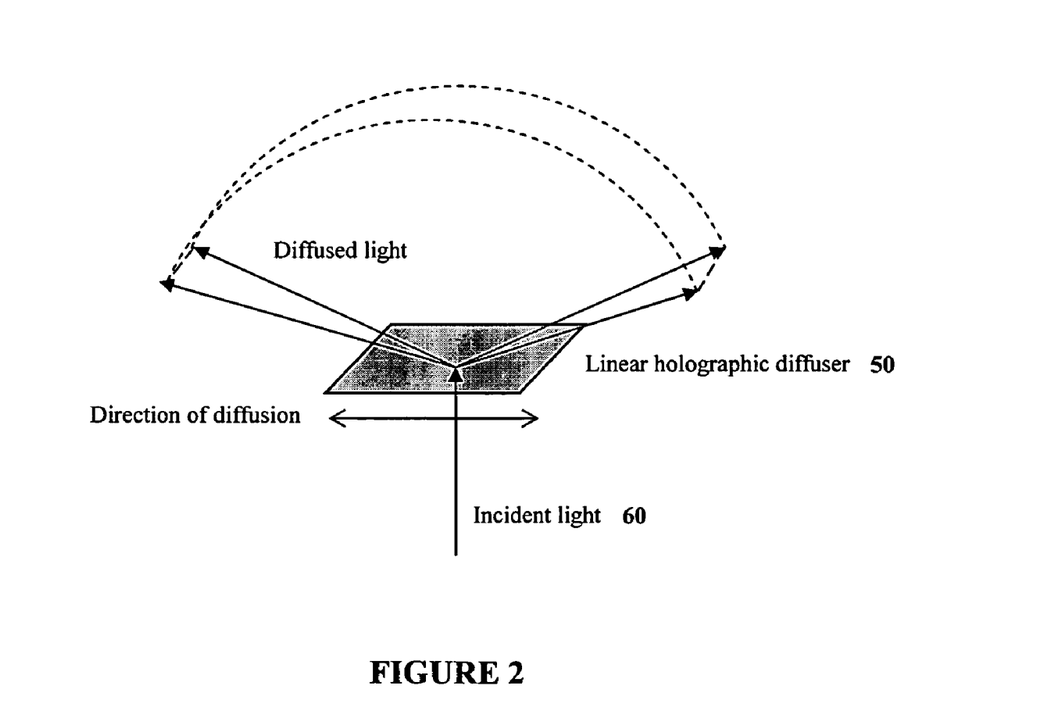
FIG. 2 illustrates the light beam path associated with a linear holographic diffuser according to the prior art.
Figure 3:
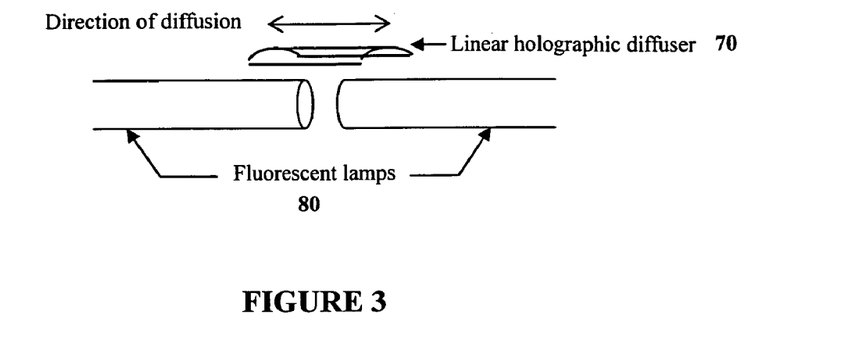
FIG. 3 illustrates the use of a linear holographic diffuser according to the prior art, for the reduction of lamp shadowing between fluorescent lamps aligned in an end-to-end configuration according to the prior art.

It is known from prior art first introduced by Caulfield, H. J., Kinoform Diffusers, SPIE Vol. 25, Developments in Holography, 1971, that a holographic diffuser 50 can preferentially diffuse incident light 60 in a single direction, with commercially achievable distributions of 90 degrees or more by ¼ degree or smaller increments as illustrated in FIG. 2. International Patent Application No. PCT/US01/22311 discloses a method of using a variant of a holographic diffuser 70 called a "kinoform diffuser" to diffuse light emitted by linear fluorescent lamps 80 in order to minimize the problem of "lamp shadowing" between lamps aligned end to end as illustrated in FIG. 3.

Other issues arise when discrete light sources are used to illuminate a region, especially when discrete light sources are of varying colours enabling the adjustment of the cumulative illumination wavelength which is a blend of these individual colours. For example, the recent introduction of light emitting diodes and high brightness light emitting diodes to the gamut of commercially available light sources has made available such additional effects as colour changing or blending not achievable with fluorescent bulbs. For example, Crescent Lighting Limited Colourline products and Color Kinetics Ltd. iColor Cove® series utilise a linear array of red, green and blue light emitting diodes that are controlled such that any colour light may be projected. Using light emitting diodes is energy efficient, provides lamp longevity and provides durability. However, the fact that the individual light emitting diodes constitute different coloured point sources of light poses problems that require optical engineering solutions.

Figure 4:
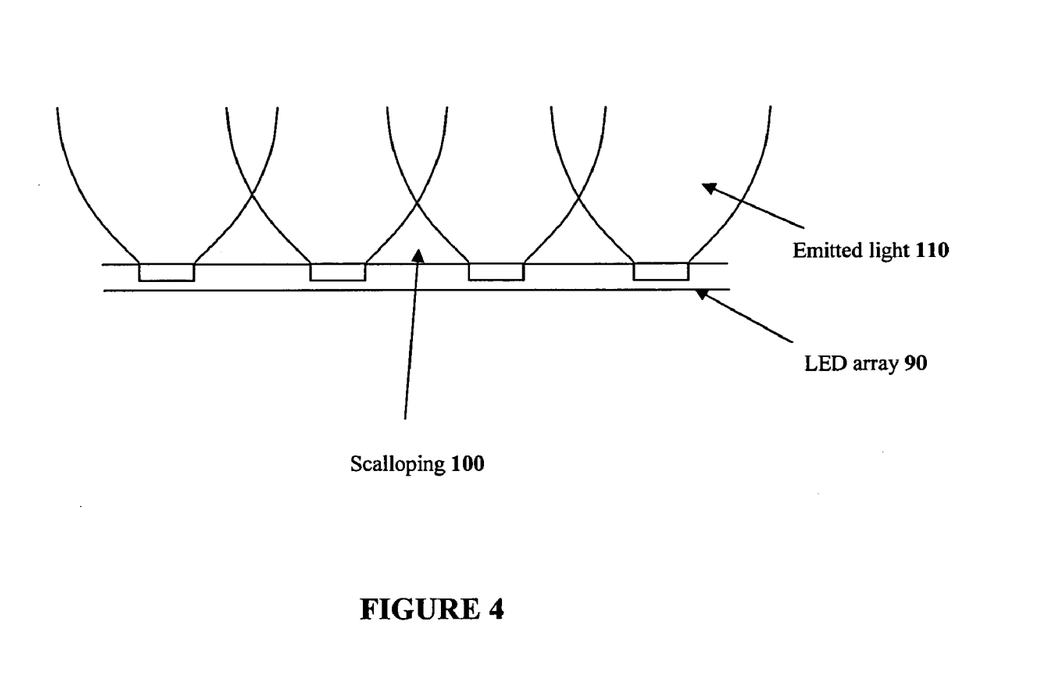
FIG. 4 illustrates the scalloping effect associated with discrete light sources used for the illumination of a surface.

For example, one disadvantage of an array of point light sources is that the illuminated portion of a surface closest to the fixture will not be completely illuminated by the full light emitting diode array 90, thereby resulting in a scalloping effect 100 of the emitted light 110 as illustrated in FIG.

4. The optics associated with this type of lighting fixture, in particular with the light sources themselves, are designed for maximum 'throw', which is the maximum distance of the illuminated area from the fixture. As such, the quality of illumination on the portion of the wall closest to the fixture is compromised in the interest of throw.

Figure 5:
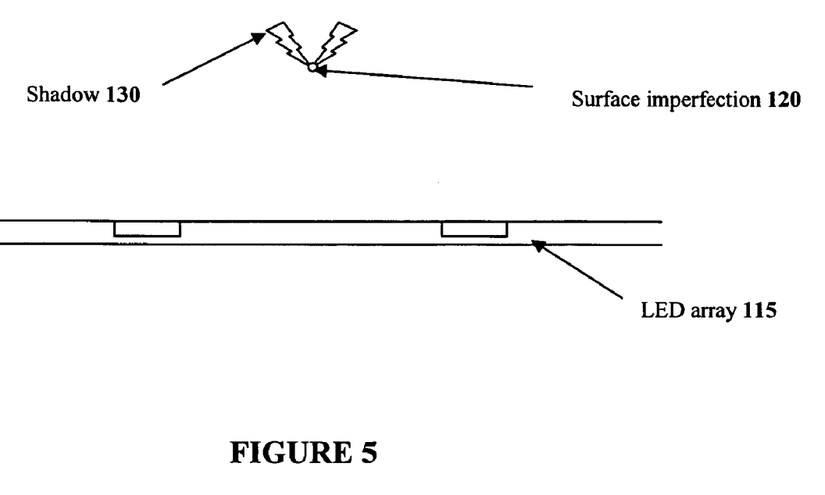
FIG. 5 illustrates the shadowing effect resulting from a surface imperfection on a surface illuminated by a series of discrete light sources.
Figure 6:
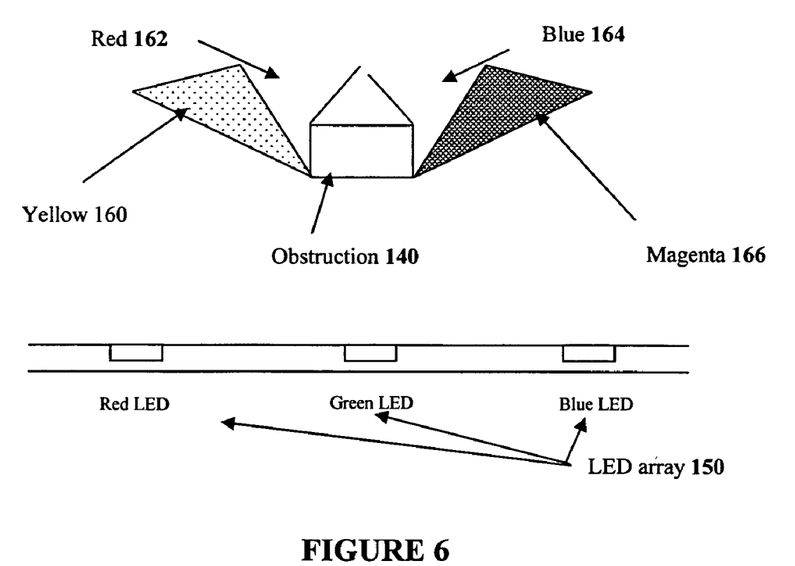
FIG. 6 illustrates the multi-coloured shadows resulting from an obstruction on a surface illuminated by a series of discrete light sources having varying illumination wavelengths.

A further disadvantage of the array of light emitting devices 115 is that any imperfections 120 on the illuminated surface, for example a raised mark on a wall, may be highlighted by multi-colored shadows 130 as illustrated in FIG. 5. Furthermore, any obstruction 140 positioned on the illuminated wall will cast a shadow and the point-source light emitting diode array 150 can result in multi-colored shadows or regions 160, 162, 164, 166, for example as illustrated in FIG. 6.

As such there is a need for a new system and method for the diffusion of illumination from discrete light sources in order to counter act the above inadequacies currently encountered.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for the diffusion of illumination produced by discrete light sources. In accordance with an aspect of the present invention, there is provided an illumination system comprising: a substrate having a plurality of light-emitting elements thereon, said light-emitting elements arranged in an array and said light-emitting elements producing illumination having one or more wavelengths, said substrate having sides and a length; at least one diffuser proximate to the light-emitting elements, said diffuser collecting the illumination produced by the light-emitting elements and redirecting the illumination in one or more predetermined directions, thereby blending the one or more wavelengths of the illumination and concentrating the illumination in the predetermined directions; and a power system for energising the light-emitting elements and for controlling the illumination produced by the light-emitting elements.

DETAILED DESCRIPTION OF THE INVENTION

Definitions

The term "light-emitting element" is used to define any device that emits radiation in the visible region of the electromagnetic spectrum when a potential difference is applied across it or a current is passed through it, for example, a semiconductor or organic light-emitting diode (LED) or other similar devices as would be readily understood, and may include any electronic circuit drivers that may be needed to control its activation. It would be readily understood by a worker skilled in the art, that a light-emitting element can emit radiation in the visible region of the electromagnetic spectrum or any other region for example in the infrared or ultraviolet regions.

The term "diffuser" is used to define a device that scatters incident electromagnetic radiation, including visible light, infrared and ultraviolet radiation by means of diffuse transmission or reflection into a variety of luminance distribution patterns.

Unless defined otherwise, all technical and scientific terms used herein have the same meaning as commonly understood by one of ordinary skill in the art to which this invention belongs.

The present invention provides a system and method for the diffusion of illumination from discrete light sources such that the illumination is blended and directed in one or more desired directions. The illumination system comprises a substrate having a plurality of light-emitting elements thereon which are arranged in an array, wherein these light-emitting elements produce illumination at one or more wavelengths. Proximate to the light-emitting elements is a diffuser, which collects the illumination produced by the discrete light-emitting elements and redirects this illumination in one or more predetermined directions, thereby blending together the one or more wavelengths of illumination and concentrating the illumination in the predetermined directions. The illumination system further comprises a power system, which provides energy to the light-emitting elements thereby resulting in their activation. This power system further provides a means for controlling the illumination produced by the light-emitting elements through the regulation of the flow of energy thereto. Through the blending of the illumination produced by the discrete light-emitting elements together with the redirection of the illumination in a desired direction, both of which are enabled by the diffuser placed proximate to the discrete light-emitting elements, the creation of a blended pattern of illumination from these discrete light-emitting elements is provided, wherein this pattern of illumination can be one or more lines or planes of illumination. In addition, through this blending and redirecting of the illumination, the scalloping effect and the multi-coloured shadowing effect can be reduced or even eliminated, when this illumination is directed towards a surface.

Lighting Components

The lighting components associated with the illumination system comprise a plurality of light-emitting elements providing illumination, wherein these devices are arranged in one or more arrays on one or more substrates. The light-emitting elements are electrically interconnected to a power system, which provides a means for the control of energy thereto for activation. The power comprises means for regulating the supply of energy to each light-emitting element thereby controlling the illumination level in addition to activation and deactivation of the light-emitting elements.

In one embodiment of the invention, the light-emitting elements can be arranged in a linear one-dimensional array or a planar two-dimensional array. A two dimensional array can provide a means for the integration of more light-emitting elements onto a substrate having a predetermined size and therefore an increase in the illumination provided thereby. In addition, the light-emitting elements can be designed in order to produce a desired visible wavelength of light thereby producing the desired illumination colour. Additionally, in order to produce a desired effect, varying light-emitting elements and hence colour illumination produced thereby can change along the length of the substrate. In one embodiment, light-emitting elements can be sequentially positioned in an order of red, green and blue, or similar repeatable sequence such that through the appropriate positioning of the diffuser over these light-emitting elements, the production of illumination having a single colour along the length of the diffuser can be possible. Optionally, through sequencing the activation of light-emitting elements, the perceived movement of the illumination along the length of the substrate can be achieved.

In one embodiment, wherein the light-emitting elements are arranged in a two-dimensional array, there can be a collection of light-emitting elements in a direction perpendicular to the longitudinal axis of the substrate. For example, these light-emitting elements can produce red, green and blue light respectively, wherein using specific control parameters for each of these three colours of light-emitting elements can enable the production of any visible colour. In this manner a particular illumination system is capable of producing any visible colour in the spectrum in addition to adjusting this colour during operation.

In one embodiment of the invention, the substrate is in the form of a printed circuit board wherein electrical interconnection of the light-emitting elements and controllers for regulating the flow of energy to the light-emitting elements can be integrated onto the substrate.

Diffuser

The diffuser is positioned proximate to the light-emitting elements thereby providing a means for the blending and redirecting of illumination entering the diffuser from these discrete devices. In this manner the diffuser is enabling the creation of a blended pattern of illumination from these discrete light sources, for example, the creation of a line or plane of blended light.

Light diffusion operates on a microscopic scale, wherein illumination enters the diffuser at an angle $\theta$, and exits the diffuser within a range of angles formulaically dependent on this angle $\theta$, wherein the range of diffusion depends on the surface structure of the diffuser. Additionally, a diffuser can be manufactured in order to diffuse light into a variety of planes.

Diffusers can be produced using a variety of methods, such as photographic techniques, producing "kinoform" or "holographic" diffusers, or by the sandblasting of glass or the frosting of plastic. In particular, a holographic diffuser is a surface relief hologram, which can be embossed into a deformable material such as acrylic, polycarbonate or a variety of other plastics, from which the diffuser is manufactured. Holographic diffusers are typically characterised by transmissive efficiency, wavelength range and output angle distribution of the light beam. They can be up to 94% transmissive, depending on the material used, and can offer superior optical transmission between approximately 365 nm and 1600 nm, wherein both of these characteristics exceed the typical throughput characteristics of ground glass or filled polycarbonate, for example. Holographic diffusers smooth and homogenise scattered sources while providing uniform illumination.

A diffuser can be manufactured to meet different specifications, such as exit beam distribution angle, the angle range within which the emitted illumination will occupy; uniform beam distribution, wherein incident light is uniformly scattered within the specified beam distribution; no backscatter, wherein there is no reflection of the incident light; no absorption, wherein none of the incident light is absorbed by the diffuser; complete diffusion such that there is not an appearance of an illumination 'hot spot' when looking at the light source through the diffuser; and wavelength independence such that the scattering properties of the diffuser is equivalent for all wavelengths of light.

In one embodiment of the present invention, the diffuser is a holographic diffuser, which has a linear distribution of light. This form of diffuser can be fabricated such that its cross sectional shape is flat or rounded, for example the diffuser can have a cross sectional shape of a semicircle or a portion thereof.

In one embodiment of the present invention, the diffuser is a holographic diffuser, which has a moderately or strongly elliptical rather than a linear distribution. The advantages of such a diffuser is that it allows the designer to precisely control the width of the diffused line or plane of light, however a potential disadvantage is that the distance between the diffuser and the light-emitting elements must be increased with decreasing eccentricity in order to ensure an even luminance distribution along the length of the diffuser.

In an alternate embodiment, the diffuser is a holographic diffuser, which has been optimised for a narrow band of wavelengths. In this manner only a particular band of wavelengths of light will be diffused by the diffuser. For example, this narrow band of wavelengths can be centred on the peak wavelength of illumination that is produced by a particular light-emitting element. This can enable the creation of a more accurate colour due to the reduction of the diffusion of additional wavelengths of light that can alter or detract from the intended colour.

In another embodiment, instead of the incorporation of a holographic diffuser, a replica diffraction grating that is produced from a holographic or ruled diffraction grating master with an appropriate blaze angle, or a mechanically produced or mastered directional diffuser similar to Rosco Brand Tough Silk or similar theatrical diffuser products, can replace the diffuser and provide the required functionality thereof.

Configurations of the Illumination System

In one embodiment of the present invention, the orientation and configuration of the diffuser proximate to the substrate is such that it enables the blending of the illumination produced by the plurality of light emitting diodes and redirects this illumination such that one or more different light effects or light patterns are produced.

Figure 7:
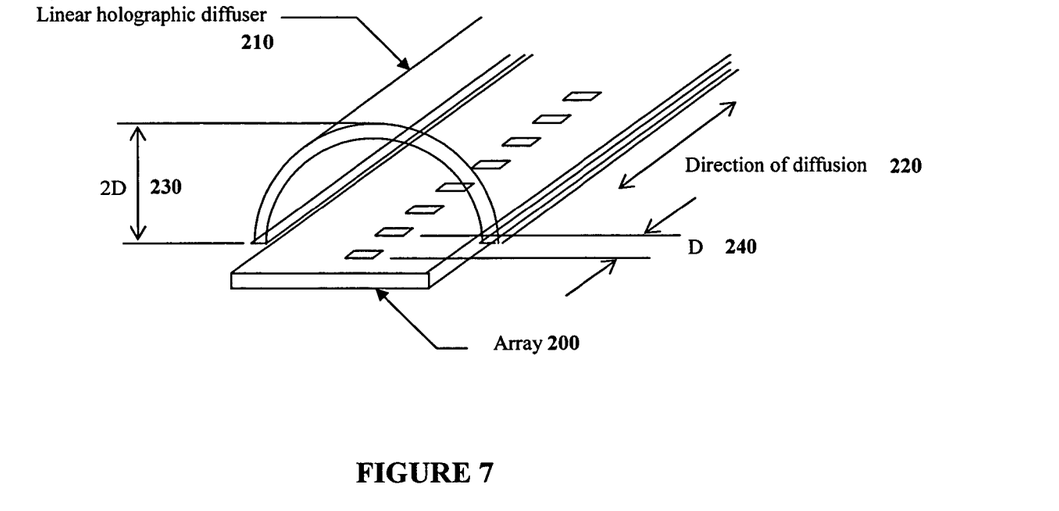
FIG. 7 illustrates one embodiment of the present invention, wherein a linear holographic diffuser is positioned above the light-emitting elements.

In one embodiment of the present invention the alignment of the diffusion direction is parallel with the direction of a linear array 200 of light-emitting elements, thereby producing a thin line of light. As illustrated in FIG. 7, the holographic diffuser 210 is oriented such that its direction of diffusion 220 is parallel to the one-dimensional linear array of light-emitting elements. The spacing 230 between the diffuser and the light-emitting elements can be determined in order to provide an even illumination along the length of the substrate holding the light-emitting elements. For example, if the light-emitting element spacing is D 240, an appropriate separation between the diffuser and the substrate would be approximately 2D to provide the desired even illumination. The diffuser is bent perpendicular to the direction of diffusion such that it forms a semicircular cross-section whose centre of curvature intersects the light-emitting elements, thereby enabling the line of light to be visible from different viewing angles. In this configuration the image of the light-emitting elements as seen through the diffuser can appear as a continuous line with even luminance. The width of the line is approximately equal to the physical width of the light-emitting elements and is independent of the cross-sectional diameter of the holographic diffuser. This effect can occur for all angles perpendicular to the linear array of light-emitting elements, with an intensity that is proportional to the luminous intensity distribution of the light-emitting elements in the same direction.

In one embodiment, the transmittance of a holographic diffuser can be up to 94 percent because it acts as a random phase plate in perturbing the incident wavefront rather than scattering it. This transmittance can be maximised when the incident radiation is perpendicular to the diffuser surface, a condition that can be provided to within a few degrees by the geometric configuration of the diffuser. An advantage of this transparency of the holographic diffuser is that the high luminance of the line effectively masks the appearance of the diffuser itself. Under low ambient light conditions, the diffuser itself can become effectively invisible, and as such the line of light may appear to simply float in air. When the ambient levels are sufficient to make the diffuser visible due to reflection of this ambient light, the line can appear to float in the centre of the diffuser. Optionally, by painting the substrate black in order to avoid reflection of stray light from the light-emitting elements or ambient light, can enhance this desirable visual effect.

In comparison with a diffuse plastic tube, the luminance of the line of light created according to one embodiment of the present invention, can be much higher in most directions as the transmittance of the holographic diffuser can be between 25 percent and 300 percent higher than that of a diffuse tube, depending on the absorption of the materials used to fabricate both the holographic diffuser and the diffuse tube. Additionally, the cross-sectional width of the line compared to the physical diameter of the plastic tubing can be on the order of 20:1 to 50:1, depending on the dimensions of the light-emitting elements. Thus the line luminance can exceed the tubing luminance by between 30 and 150 times using the same one-dimensional array of light-emitting elements. As such, reducing the number of light-emitting elements required per unit length of the array, still resulting in a line illumination level equal to that of a diffuse tube, will thus be more energy efficient.

In one embodiment, the linear array of light-emitting elements are arranged in order red-green-blue. In this type of configuration, through a suitable spacing between the light-emitting elements and the diffuser, approximately 6×D, where D is the light-emitting element separation, the line can appear to be uniformly one colour. Depending on the power provided to each colour of light-emitting element, this colour can be anywhere within the light-emitting element's colour gamut. By controlling the power provided to individual light-emitting elements, the line can appear to vary in colour along its length, without a visible indication of the discrete light-emitting elements providing the illumination.

Figure 8:
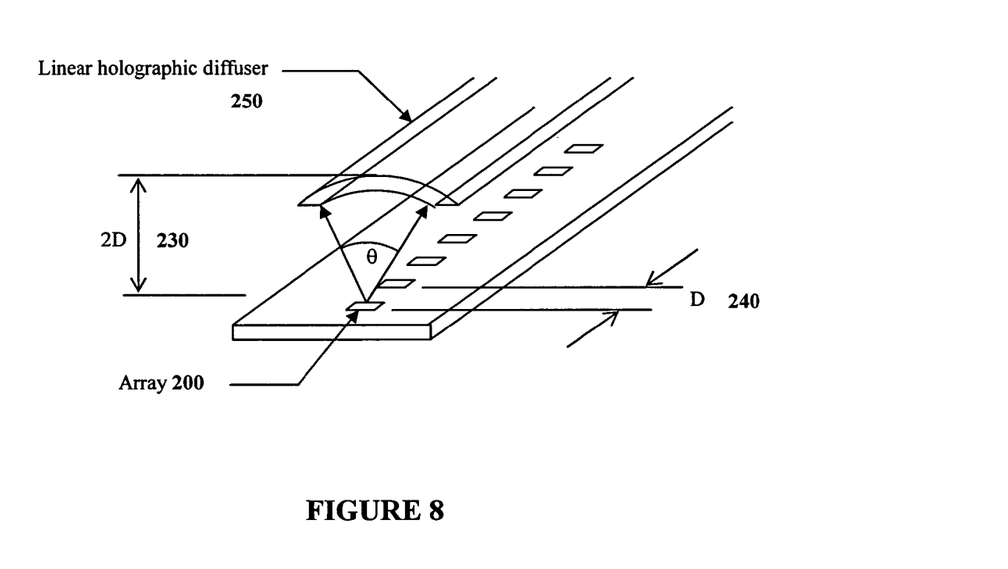
FIG. 8 illustrates an alternate cross sectional shape of the holographic diffuser in FIG. 7.

In another embodiment of the present invention, the light-emitting elements are provided with collimation optics, and in circumstances where a limited angular distribution perpendicular to the length of the linear array 200 of light-emitting elements is desired, the holographic diffuser 250 can be only for the desired angular segment θ 260, as illustrated in FIG. 8. A particular advantage of such a configuration is that the width of the assembly, typically defined by the width of the diffuser, is less than 2×D, for example, for a desired angular separation θ, the required width becomes 2D*2 tan(θ/2).

Figure 9:
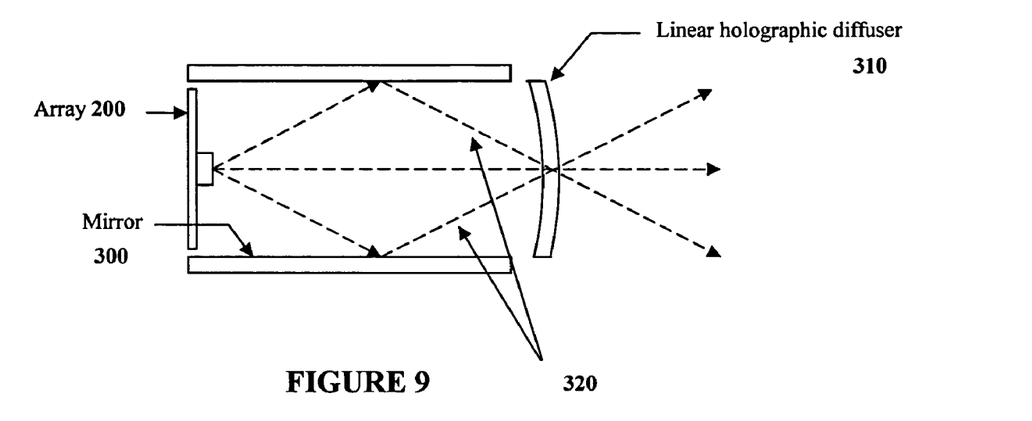
FIG. 9 illustrates another embodiment of the invention wherein flat mirrors are positioned at the sides of the light-emitting elements.

In another embodiment, integrated into the illumination system are two parallel, but not necessarily flat, mirrored surfaces, as illustrated in FIG. 9. In such a configuration both the illumination produced by the array 200 of light-emitting elements, together with the reflections 320 thereof are diffused into multiple visible lines by the holographic diffuser 330. Depending on the spacing of the mirrors, one or a multiplicity of lines will be visible to a viewer. Optionally, this configuration comprises curved mirrors 325 that produce a multiplicity of lines visible by a viewer with variable interline spacing, as illustrated in FIG. 10.

Figure 10:
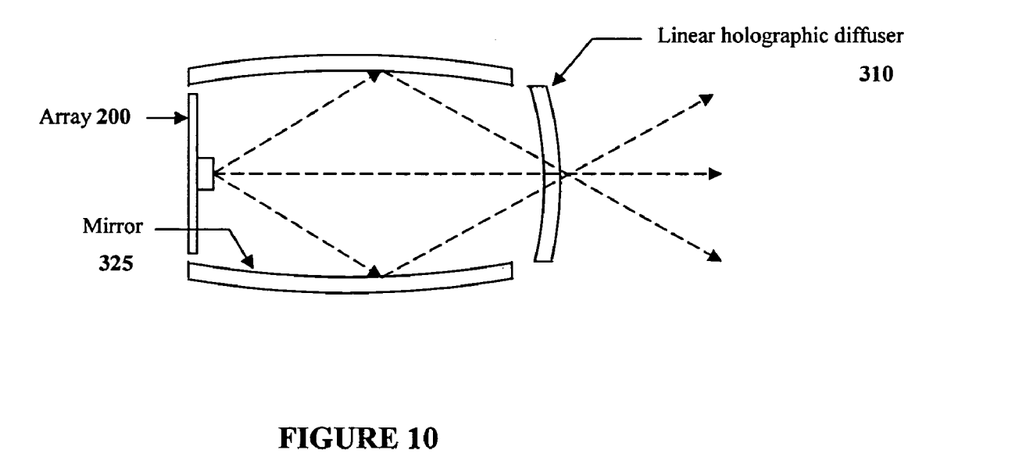
FIG. 10 illustrates another embodiment of the invention, wherein curved mirrors are positioned at the sides of the light-emitting elements.
Figure 11:
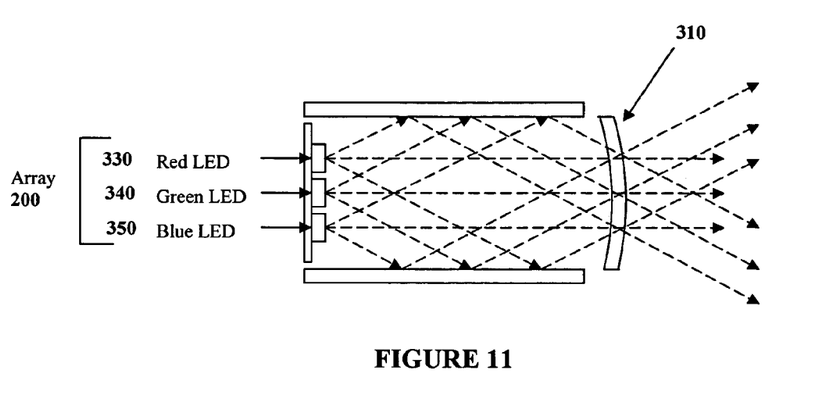
FIG. 11 illustrates the embodiment according to FIG. 9, wherein multicoloured light-emitting elements are provided on the substrate perpendicular to the length of the substrate.

In a further embodiment of the present invention a configuration similar to FIGS. 9 and 10 is illustrated in FIG. 11, wherein the array of light emitting elements comprises a multiplicity of light-emitting elements arranged in parallel rows perpendicular to the length of the substrate, in order to produce a multiplicity of lines of various colours visible by a viewer, as illustrated in FIG. 11. For example the array 200 of light emitting elements comprises parallel rows of red, green and blue light emitting elements 330, 340, 350, respectively.

Figure 12:
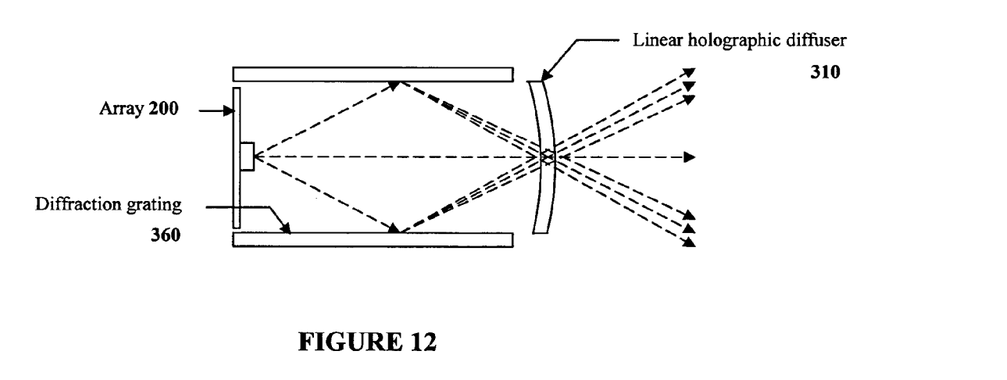
FIG. 12 illustrates another embodiment of the invention wherein diffraction gratings are positioned in front of the light-emitting elements.

Optionally in another embodiment, the mirrors as illustrated in either FIG. 9 or 10, for example, are replaced by diffraction gratings 360, as illustrated in FIG. 12. A particular advantage of this embodiment is that the reflections can be chromatically dispersed. However, due to the narrowband but not monochromatic spectral distributions of high brightness light emitting diodes, for example, the width of the line due to diffraction can be broadened and can exhibit colour fringing.

Figure 13:
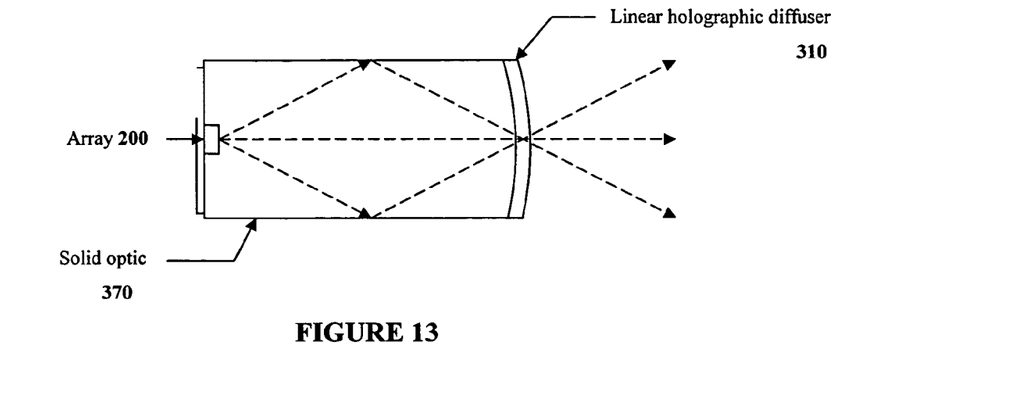
FIG. 13 illustrates another embodiment of the invention wherein solid optics are positioned in front of the light-emitting elements.

In a further embodiment, the lateral sides of the substrate having the linear array of light-emitting elements comprise a solid transparent object 370, as illustrated in FIG. 13. Depending on the distribution of the light-emitting elements and the refractive index of the solid object, single or multiple reflections of the light-emitting elements can occur from polished sides of the solid object due to total internal reflection. In this example, the light-emitting elements and possibly the diffuser may be optically coupled to the solid object with an index matching fluid or optical adhesive. Optionally, diffraction gratings are moulded onto the sides of the object, using either embossing, injection moulding, or extrusion techniques. Additionally, the holographic diffuser can be similarly moulded onto the front of the object as a surface relief microstructure.

Figure 14:
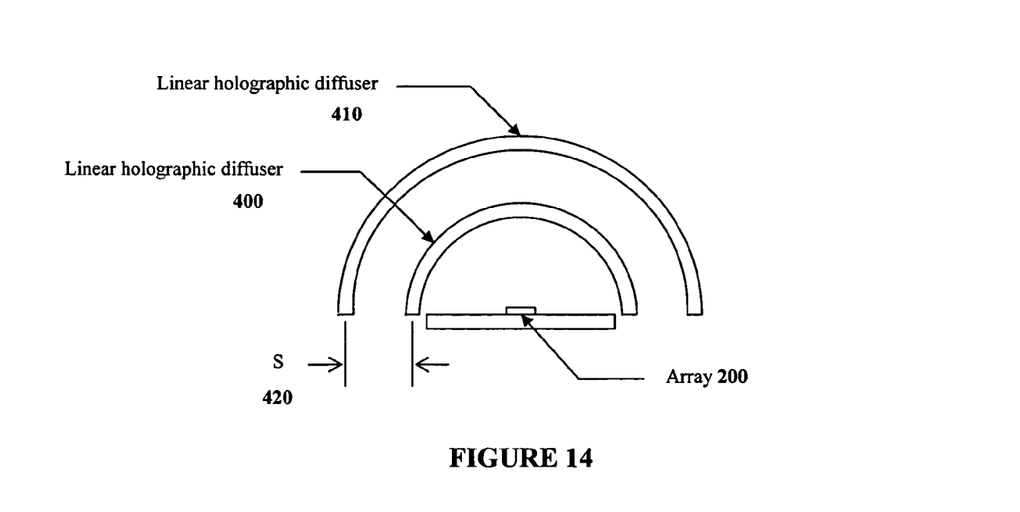
FIG. 14 illustrates another embodiment of the invention, wherein two linear holographic diffusers are positioned one on top of the other.

In another embodiment of the present invention, two linear or elliptical holographic diffusers 400 and 410 can be "stacked" above the array 200 of light emitting elements as illustrated in FIG. 14. By varying the spacing S 420 between these two diffusers, the width of the diffused line can be modified.

Figure 15:
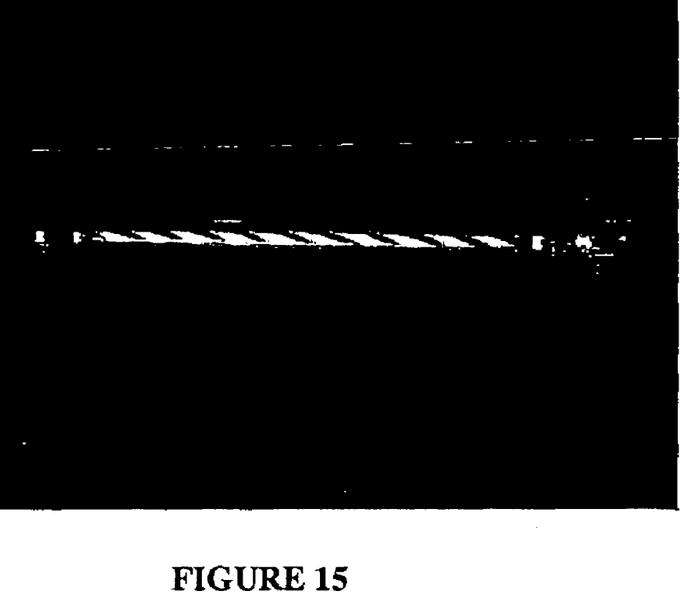
FIG. 15 illustrates one embodiment of the present invention, wherein holographic diffusers are positioned such that the direction of diffusion is tangential to the length of the strip.
Figure 16:
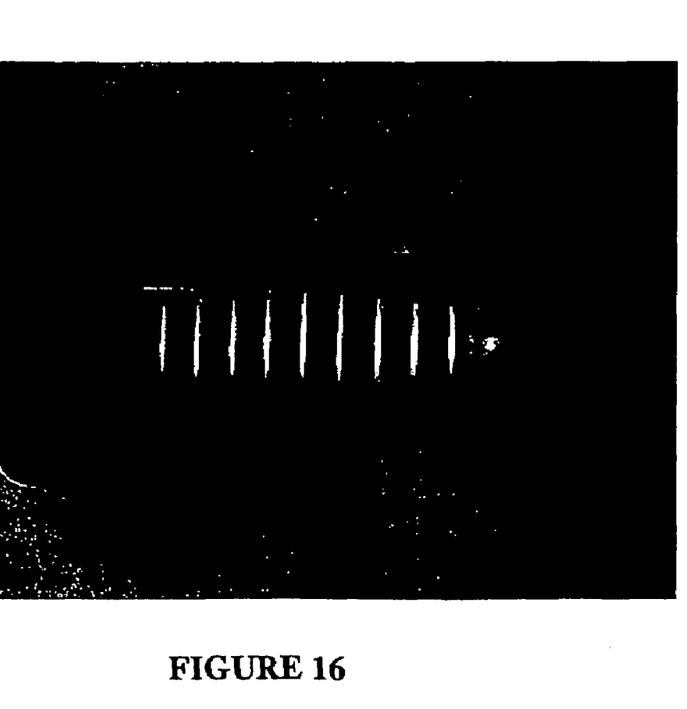
FIG. 16 illustrates one embodiment of the present invention, wherein holographic diffusers are positioned such that the direction of diffusion is perpendicular to the length of the strip.

FIG. 15 shows the illumination pattern produced according to one embodiment of the present invention. In this example, the linear holographic diffuser is oriented tangential to the axis of the linear array of light-emitting elements. FIG. 16 shows the illumination pattern when this orientation is perpendicular. In these examples the illumination from each light-emitting element is diffused into a separate line observed by a viewer. In this example, the individual lines appear to float on the surface of the diffuser. Additionally, the apparent length of these lines can be controlled using holographic diffusers with different diffusion angles.

Figure 17:
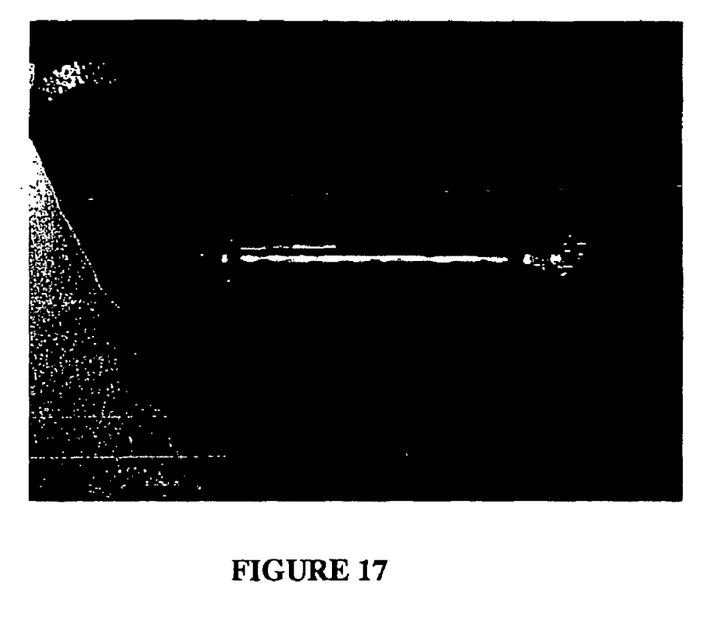
FIG. 17 illustrates one embodiment of the present invention, wherein a holographic diffuser is bent perpendicular to the length of light-emitting elements such that the centre of curvature of the diffuser does not intersect the centre of the light-emitting elements.

FIG. 17 shows the illumination pattern produced when the holographic diffuser is bent in a direction perpendicular to the longitudinal axis of the substrate such that the centre of curvature of the diffuser does not intersect the light-emitting elements or the curvature does not form a semicircle or a segment thereof. In such configurations the diffused light-emitting elements form arcs that can aesthetically pleasing, including a configuration wherein the direction of diffusion is at a small angle to the longitudinal axis of the substrate and thus form what appears visually to be a braided strand of light.

Figure 18:
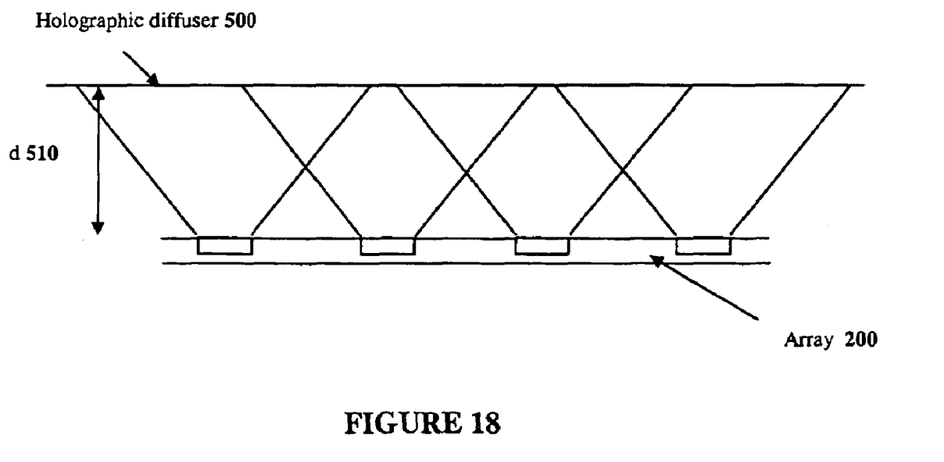
FIG. 18 illustrates another embodiment of the present invention, wherein the diffuser is a flat holographic diffuser.
Figure 19:
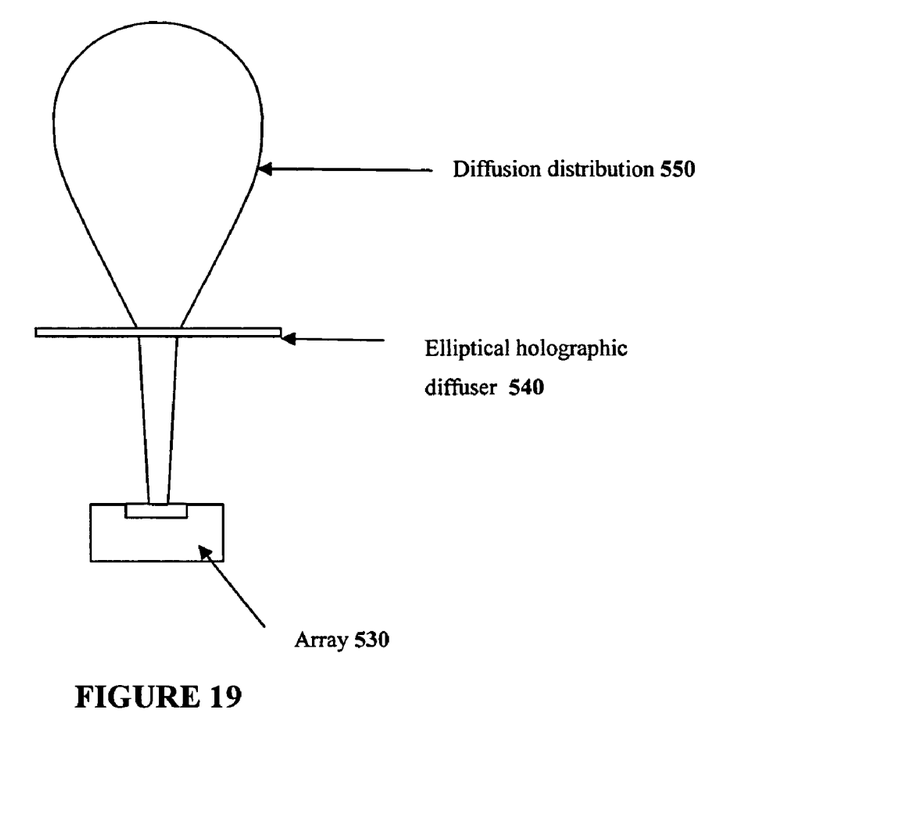
FIG. 19 illustrates another embodiment of the present invention, wherein the diffuser is an elliptical holographic diffuser.

In a further embodiment as illustrated in FIG. 18, wherein the present invention is used to project light onto a surface, a flat diffuser 500 is placed at a distance d 510 above and parallel to the array 200 of light-emitting elements. The light travels from the array of light-emitting elements, enters the diffuser at a right angle and subsequently exits the diffuser in a plane perpendicular to the surface of the diffuser and parallel to the direction of illumination projection by the array of light-emitting elements. The flat linear holographic diffuser will only transmit light that enters at an angle essentially perpendicular to the surface of the diffuser, thereby creating a thin line of light having a width equal to that of the individual light-emitting elements. Optionally, using an elliptical holographic diffuser 540 instead of a linear holographic diffuser can 'soften' the diffusion distribution 550 in the direction perpendicular to the array of light-emitting elements as illustrated in FIG. 19. In FIG. 19, the array 200 of light emitting elements comprises collimating optics.

Figure 20:
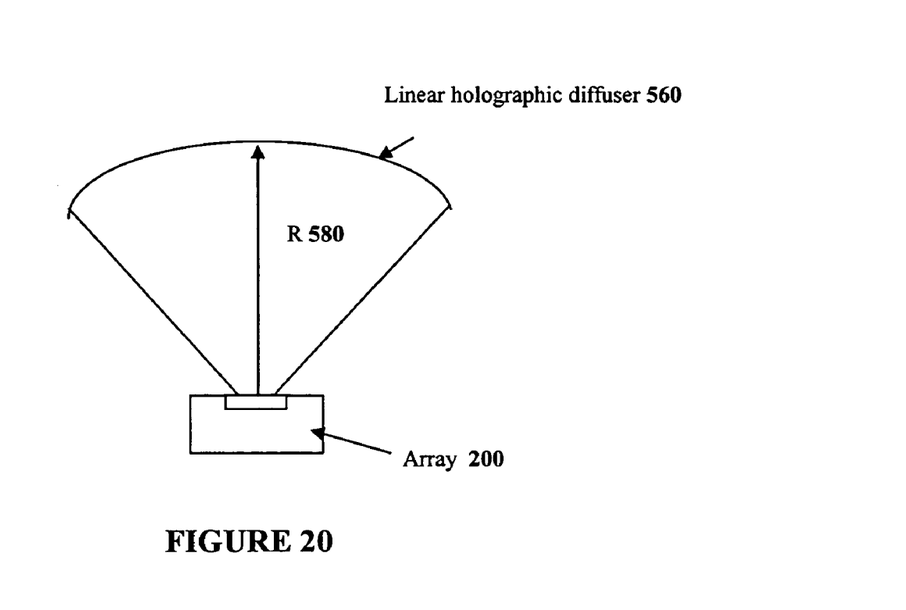
FIG. 20 illustrates another embodiment of the present invention, wherein the diffuser is a curved linear holographic diffuser.
Figure 21:
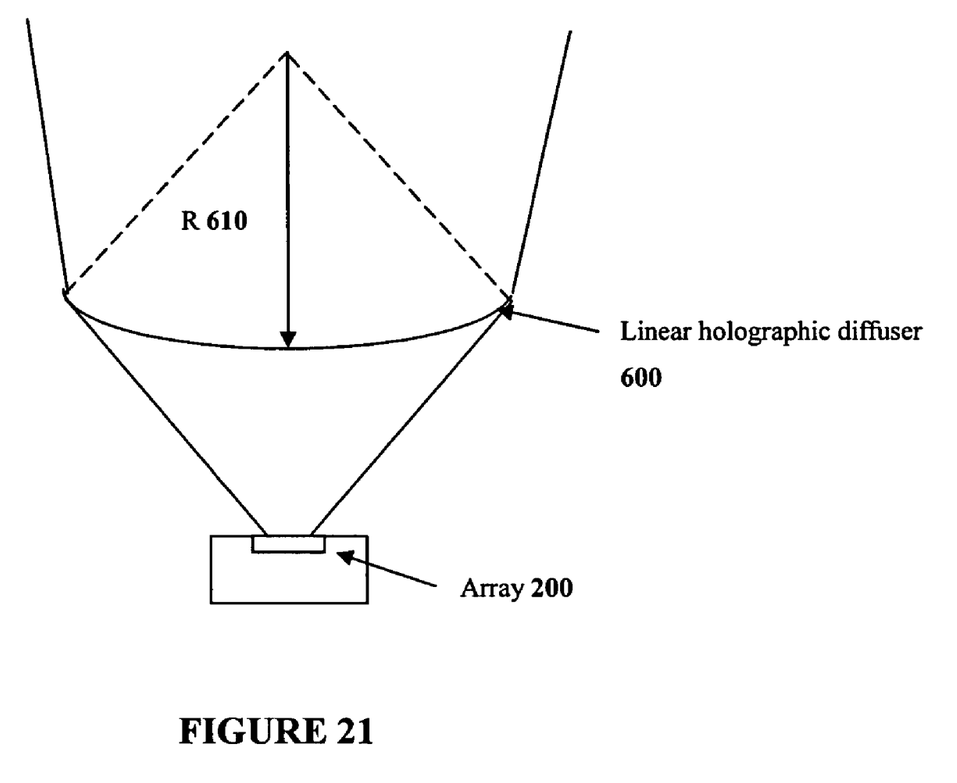
FIG. 21 illustrates another embodiment of the present invention, wherein the diffuser is an alternate curved linear holographic diffuser.

In another embodiment of the invention, the linear holographic diffuser 560 is bent into a circular arc, the centre of radius, R 580 of which is proximate to the location of the array 200 of light-emitting elements as illustrated in FIG. 20. An advantage to this configuration is that each ray is linearly diffused in a direction parallel to the array. Unlike the diffusion distribution of elliptical diffusers as illustrated in FIG. 19, the diffusion distribution provided by this embodiment exhibits sudden transition from full intensity illumination to zero intensity, thereby eliminating light emitted to the sides of the device. This can result in a more efficient use of the light emitted by the light-emitting elements, since illumination projecting away from a wall would typically be wasted. Optionally, as illustrated in FIG. 21, the linear holographic diffuser 600 can be bent into a circular arc such that the centre of radius, R 610 lies above the diffuser. This configuration can "focus" the light in a manner similar to a linear convex lens, which has the desired effect of collimating the light emitted by the array 200 of light-emitting elements in a direction perpendicular to the array thereof.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An illumination system comprising:
a) a substrate having a plurality of light-emitting elements thereon, said light-emitting elements arranged in an array and said light-emitting elements producing illumination having one or more wavelengths, said substrate having sides and a length;
b) at least one diffuser proximate to the light-emitting elements, said diffuser collecting the illumination produced by the light-emitting elements and redirecting the illumination in one or more predetermined directions, thereby blending the one or more wavelengths of the illumination and concentrating the illumination in the predetermined directions; and
c) a power system for energising the light-emitting elements and for controlling the illumination produced by the light-emitting elements.

2. The illumination system according to claim 1, wherein said diffuser is a holographic diffuser that produces a linear distribution of the illumination.

3. The illumination system according to claim 2, wherein said diffuser has a cross sectional shape selected from the group comprising flat, round, semicircle and an angular segment.

4. The illumination system according to claim 1, wherein said diffuser is a holographic diffuser that produces a moderately or strongly elliptical distribution of the illumination.

5. The illumination system according to claim 1, wherein the diffuser is a holographic diffuser that diffuses only predetermined wavelengths of the illumination.

6. The illumination system according to claim 1, wherein the diffuser is a replica diffraction grating.

7. The illumination system according to claim 1, wherein the diffuser is a mechanically produced or mastered directional diffuser.

8. The illumination system according to claim 1, wherein the array is a linear array, the one or more predetermined directions are parallel to the linear array and the diffuser has a cross section having a centre of radius intersecting the light emitting elements.

9. The illumination system according to claim 8, wherein the diffuser has a semicircular cross section.

10. The illumination system according to claim 8, wherein the diffuser has an angular segment cross section.

11. The illumination system according to claim 1, further comprising mirrors oriented perpendicular to the substrate and positioned on the sides and along the length of the substrate, said mirrors reflecting portions of the illumination towards the diffuser.

12. The illumination system according to claim 11, wherein said mirrors are flat.

13. The illumination system according to claim 11, wherein said mirrors are curved.

14. The illumination system according to claim 1, further comprising diffraction gratings oriented perpendicular to the substrate and positioned on the sides and along the length of the substrate, said diffraction gratings diffracting portions of the illumination towards the diffuser.

15. The illumination system according to claim 1, further comprising solid objects oriented perpendicular to the substrate and positioned on the sides and along the length of the substrate, said solid objects reflect portions of the illumination towards the diffuser.

16. The illumination system according to claim 1, wherein the array is a linear array and the one or more predetermined directions are tangential to the linear array.

17. The illumination system according to claim 1, wherein the array is a linear array and the one or more predetermined directions are perpendicular to the linear array.

18. The illumination system according to claim 1, further comprising a second diffuser positioned over the diffuser in a stacked configuration, wherein the diffuser and the second diffuser are separated by a predetermined distance.

19. The illumination system according to claim 1, wherein the diffuser is a holographic diffuser having a circular arc cross section having a centre of radius proximate to the light emitting elements.

20. The illumination system according to claim 1, wherein the diffuser is a holographic diffuser having a circular arc cross section having a centre of radius on a side of the diffuser opposite the light-emitting elements.

21. The illumination system according to claim 1, wherein the array is a planar array comprising two or more rows of light emitting elements along the length of the substrate.

* * * * *